United States Patent [19]

Pattantyus-Abraham

[11] 3,962,547
[45] June 8, 1976

[54] REPEATER COUPLER FOR POWER LINE COMMUNICATION SYSTEMS

[75] Inventor: Tamas I. Pattantyus-Abraham, Pittsburgh, Pa.

[73] Assignee: Westinghouse Electric Corporation, Pittsburgh, Pa.

[22] Filed: May 27, 1975

[21] Appl. No.: 580,861

[52] U.S. Cl. .......................... 179/2.5 R; 340/310 R
[51] Int. Cl.² .......................................... H04H 1/08
[58] Field of Search ................. 179/2.5 R, 2.5 A; 340/310 R, 310 A, 346, 182, 147 LP, 150

[56] References Cited
UNITED STATES PATENTS

| | | | |
|---|---|---|---|
| 1,705,903 | 3/1929 | Davee | 179/2.5 R |
| 2,481,915 | 9/1949 | Edson et al. | 179/2.5 R |
| 2,510,271 | 6/1950 | Almquist | 179/2.5 R |
| 2,516,211 | 7/1950 | Hochgraf | 179/2.5 A |

*Primary Examiner*—Thomas A. Robinson
*Attorney, Agent, or Firm*—D. R. Lackey

[57] ABSTRACT

Apparatus for connecting separate transmitters of a carrier communication system to the same location on a power distribution line. A low-power transmitter is connected to the primary winding of an interconnecting transformer. The secondary winding of the interconnecting transformer is connected between a high-power transmitter and, through the primary winding of a coupling transformer, to ground potential. The secondary winding of the coupling transformer is coupled to the power distribution line. A voltage limiting device is connected across the secondary winding of the interconnecting transformer. The output of the high-power transmitter is directed across the voltage limiting device to the coupling transformer where it is applied to the distribution line. When the low-power transmitter is turned on and the drive signal to the high-power transmitter is turned off, the power from the low-power transmitter is transferred to the secondary winding of the interconnecting transformer and to the coupling transformer where it is applied to the distribution line. The high-power transmitter represents a virtual ground potential when it is not transmitting, thereby providing a closed circuit path for the power delivered by the low-power transmitter.

8 Claims, 3 Drawing Figures

3,962,547

REPEATER COUPLER FOR POWER LINE COMMUNICATION SYSTEMS

BACKGROUND OF THE INVENTION

1. Field of the Invention

This invention relates, in general, to power line communication systems and, more specifically, to carrier signal systems for distribution power lines.

2. Description of the Prior Art

Carrier communication systems for power lines have been in use for many years to transfer information between various points in the power system. However, most of the systems in use presently are confined to the transmission lines of the power system and do not span the secondary or distribution lines of the power system which lead to the customer location. There is considerable research and development presently being conducted in the area of communications between the customer location and locations along the transmission line facilities of the electric utility company. Both one-way and two-way communication systems have been described in the literature and are being operated to a limited extent.

In general, a two-way communication system has the capability of relaying information relative to the electrical power consumed by the customer, information concerning other quantities relative to the consumption of electrical power such as the rate of the consumption, the time in which the peak load is consumed, and the power factor at which the load is consumed, and other information which may be desired by the electric utility company in controlling and interpreting the electrical power used by the customer. Control signals may also be generated and transmitted from a remote location to the customer location to control the total amount of power used by the customer or to selectively disconnect certain electrical apparatus from the customer's electrical supply system under certain conditions, or for any other control reasons desired.

Attenuation along the power lines has been one of the major obstacles which exist in the way of standardized and reliable communication systems which span the entire power line network, including the secondary distribution lines which extend to the customer locations. It has been found that, for attenuation purposes, carrier frequencies in the range between 70 kHz and 90 kHz ensure good performance along the primary feeder lines of the power system. It has also been found that carrier frequencies in the range between 300 kHz and 350 kHz provide good performance along the secondary distribution lines of the power system. Consequently, to provide the best overall performance along the entire power system, it is necessary to change the carrier frequency at the junctions between the primary feeder lines and the secondary distribution lines. Normally, these junctions are usually at the location of a distribution transformer which, from experimental testing, has been found to be a source of high attenuation for the transmission of carrier communications.

In order to reduce the effects of the attenuation of distribution transformers, some communication systems use repeater or translator transmitters which are located at each distribution transformer location. These translators receive carrier communications on one frequency from the secondary distribution line and convert the intelligence to another carrier frequency which is applied to the primary feeder line. These translators also translate the carrier frequency received from the primary feeder line and apply the translated carrier to the secondary distribution line. The carrier frequencies used are those which exhibit the lowest attenuation characteristics for the particular power line to which the translators are connected.

Such translators include more than one transmitter to relay the communications around the distribution transformer. A typical translating system includes a high-power transmitter and a low-power transmitter which are both connected to the same location on a power distribution line. The high-power transmitter is characterized by a low impedance output. This low impedance output significantly affects the coupling of the low-power transmitter to the same distribution line even though the high-power transmitter is not transmitting when the low-power transmitter is turned on and transmitting. Thus, some type of switching or connecting arrangement is required to isolate the high-power transmitter from the low-power transmitter to permit effective use of the communication signal available.

Conventional relay devices would provide sufficient isolation between the two transmitters under normal operating conditions. However, the maintenance associated with such electromechanical devices and the limited number of switching operations are considered a deterring factor in the use of electromechanical relays in such power line communication systems. Thus, it is desirable, and it is an object of this invention, to provide a reliable and efficient means for coupling two carrier communication transmitters to the same location on a power distribution line.

SUMMARY OF THE INVENTION

There is disclosed herein a new and useful arrangement for connecting a high-power communication transmitter and a low-power communication transmitter of a power line carrier communication system to the same power distribution line. The output of the low-power transmitter is connected across the primary winding of an interconnecting transformer. The secondary winding of the interconnecting transformer is connected between the output of the high-power transmitter and the primary winding of a coupling transformer. The secondary winding of the coupling transformer is connected, through a coupling capacitor, to the power distribution line. A voltage limiting device is connected across the secondary winding of the interconnecting transformer to limit the voltage drop across the interconnecting transformer when the high-power transmitter is turned on.

The high-power transmitter and the low-power transmitter are controlled by a common control circuit which maintains one of the transmitters in the off condition when the other transmitter is turned on and transmitting. Thus, only one transmitter may be transmitting at any particular time instant. When the high-power transmitter is transmitting, the output voltage therefrom is transferred across the voltage limiting device to the primary winding of the coupling transformer. The voltage on the primary winding of the coupling transformer induces a voltage into its secondary winding which is ultimately applied to the power distribution line. Due to the voltage limiting characteristics of the device connected across the secondary winding of the interconnecting transformer, the voltages appearing across the primary winding of the interconnecting transformer and across the output terminals of the low-power transmitter are relatively low. Thus, the voltage developed by the high-power transmitter has negligible effect upon the components of the low-power transmitter when it is turned off.

When the low-power transmitter is turned on and is transmitting, and the high-power transmitter is turned off, the output voltage of the low-power transmitter is developed across the secondary winding of the interconnecting transformer. Due to the low power output of the low-power transmitter, the voltage developed across the secondary winding of the interconnecting transformer is below the voltage limiting level provided by the voltage limiting device. In addition, the output stage of the high-power transmitter represents a virtual ground when the high-power transmitter is not transmitting. Thus, one end of the secondary winding of the interconnecting transformer is effectively connected to ground potential. Therefore, the voltage provided by the low-power transmitter is developed across the primary winding of the coupling transformer and ultimately coupled to the power distribution line. The arrangement disclosed herein provides for the coupling of the two transmitters to the distribution line without mechanical relaying devices and without energy consumption due to the low impedance of the high-power transmitter when the low-power transmitter is turned on.

BRIEF DESCRIPTION OF THE DRAWING

Further advantages and uses of this invention will become more apparent when considered in view of the following detailed description and drawing, in which.

DESCRIPTION OF THE PREFERRED EMBODIMENTS

Figure 1:
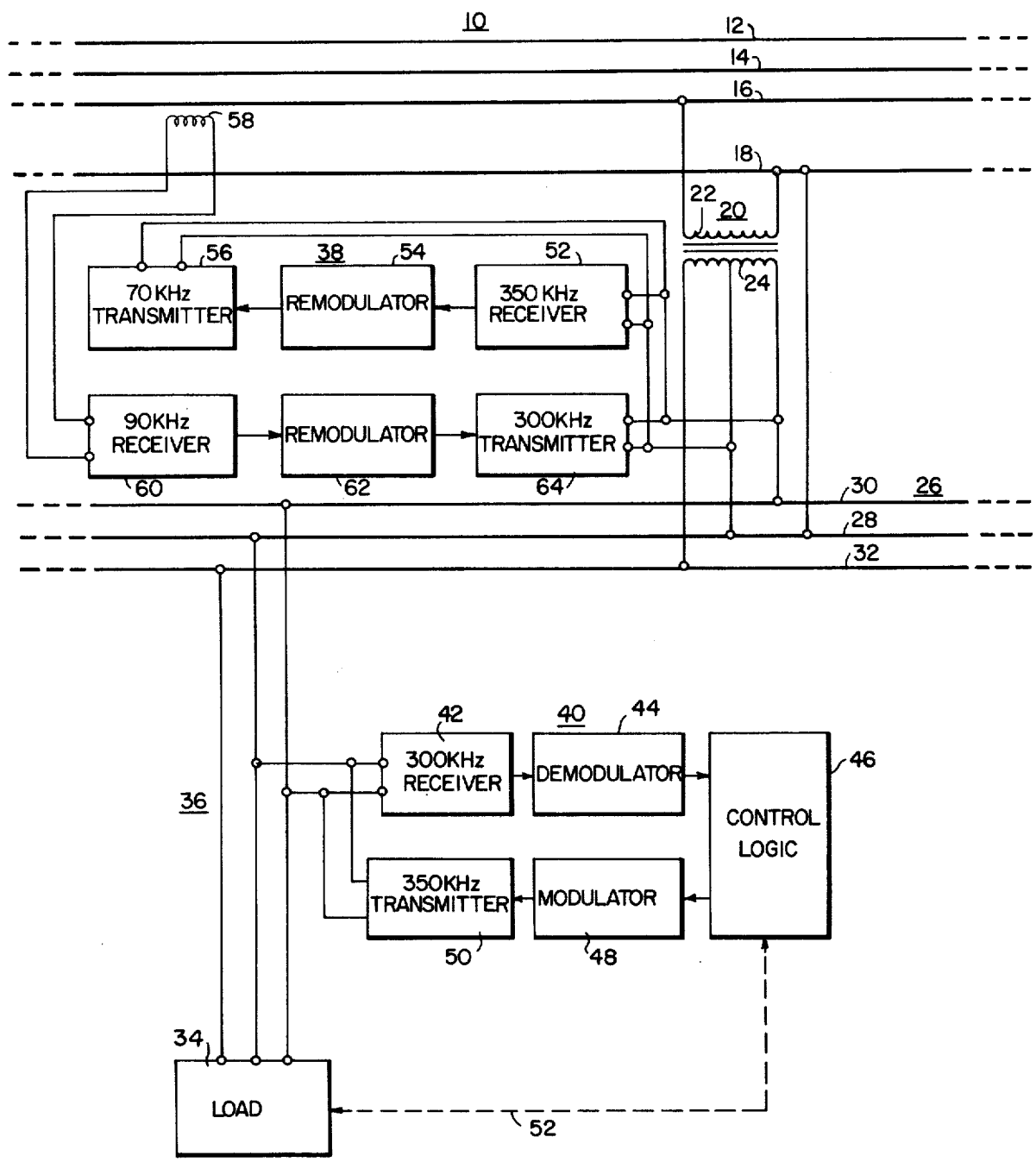
FIG. 1 is a schematic block diagram of a power line communication system which utilizes a distribution transformer repeater connected in an arrangement which requires the interconnection of a high-power transmitter and a low-power transmitter to the same terminals.

Throughout the following description, similar reference characters refer to similar elements or members in all of the figures of the drawing.

Referring now to the drawing, and to FIG. 1 in particular, there is illustrated a schematic block diagram of a portion of a power line carrier communication system. The three-phase primary feeder line 10 includes the phase conductors 12, 14 and 16, and the neutral conductor 18. It is assumed in this description that the remote receiving and transmitting equipment associated with the equipment illustrated in FIG. 1 is connected at a distant point on the primary feeder line 10 between the phase conductor 16 and the neutral conductor 18. Therefore, the signals which are to be received and transmitted by the apparatus shown in FIG. 1 are conducted essentially by the phase conductor 16 and the neutral conductor 18.

The distribution transformer 20 has its primary winding 22 connected across the phase conductor 16 and the neutral conductor 18. The secondary winding 24 of the distribution transformer 20 is connected to the single phase secondary distribution line 26. In conventional distribution line systems, the conductor 28 is the neutral conductor, and the conductors 30 and 32 are the "220-volt" conductors which are connected across the entire secondary winding 24. A load 34, which corresponds to the electrical equipment attached to the distribution line at the customer location, is shown connected across the secondary distribution line 26. It should be understood that additional customer loads may also be connected across the same distribution line 26.

Communications over the distribution line system, including the drop line 36 which connects the customer load 34 to the secondary distribution line 26, is most effective when using a carrier frequency in the vicinity of 300 to 350 kHz. Such frequencies have been found, by experimentation, to be attenuated less, along distribution lines, than most other carrier frequencies. For similar reasoning, carrier frequencies used on primary feeder lines, such as the transmission line 10, are usually in the range of 70 to 90 kHz.

In order for the communication system to ultimately reach between the load 34 and the remote location connected to the transmission line 10, it is necessary that a frequency translator or repeater be provided which changes the transmitting and receiving frequencies where the secondary distribution line portion of the communication system is connected to the primary feeder line portion of the communication system. Thus, the repeater 38, illustrated in block form in FIG. 1, is used. The other blocks illustrated in FIG. 1 represents the transmitter-receiver combination 40 which is located at the customer load location.

The communication equipment 40 includes a 300 kHz receiver 42, a demodulator 44, control logic 46, a modulator 48, and a 350 kHz transmitter 50. The control logic is connected in some manner to the customer load 34 as represented by the line 52. For example, the control logic may be responsive to the energy supplied to the load 34 by the power system. Or, the control logic may be responsive to other power consuming variables, such as the power factor at which the power is consumed, the peak demand of the consumed power, or the time of the day during which the peak demand is required. On the other hand, the control logic may receive signals from the remote communication location to activate or deactivate various devices associated with the load 34. For example, the control logic may control the amount of total power delivered to the load 34, or even whether a certain portion of the load 34 may be connected for power consumption at all, such as an air conditioning unit during times of electrical power shortages. It is pointed out that the various information and control signals conveyed through the control logic 46 may be numerous and other uses than those enumerated herein are contemplated within the scope of this invention. It is also emphasized that the particular carrier frequencies illustrated in FIG. 1 and discussed herein are only representative of frequencies which would provide a suitable communication system according to the specific embodiment of this invention. Other carrier frequencies may be used without departing from the scope of the invention.

The 300 kHz receiver 42 receives the signals which exist across the conductors 28 and 30 of the distribution line 26. The received signal is then demodulated by the demodulator 44 and applied to the control logic 46. The control logic 46 applies the proper control functions to the load 34 and accepts the appropriate data from the load 34 to be transmitted to the remote communication station connected to the primary feeder line 10. The information from the control logic 46 is processed by the modulator 48 which modulates the transmitter 50. The transmitter 50 is connected to the appropriate conductors to convey its signal through the secondary distribution line to the repeater 38.

The signal from the transmitter 50 is received by the 350 kHz receiver 52 of the repeater 38. The received signal is processed by the remodulator 54 which demodulates the received signal and modulates the 70 kHz transmitter 56. The output of the transmitter 56 is effectively connected to the secondary winding of the distribution transformer 20. The attenuation of a 70 kHz signal by the distribution transformer 20 is much less than the attenuation of a 350 kHz signal. Thus, sufficient signal from the transmitter 56 is transferred through the distribution transformer 20 to the transmission line 10. Compared to the other transmitters illustrated in FIG. 1, the 70 kHz transmitter 56 is of relatively high power to compensate for the transmission loss through the distribution transformer 20. Thus, the information transmitted originally by the transmitter 50 is converted from 350 kHz to 70 kHz by the repeater 38 and sent on down the transmission line 10.

Signals originating from the remote communication station which is connected to the primary feeder line 10 are received by the pickup coil 58 and applied to the 90 kHz receiver 60. The received signal is processed by the remodulator 62 and applied to the 300 kHz transmitter 64. The output of the transmitter 64 is also connected across the secondary winding of the distribution transformer 20 and sends signals to the 300 kHz receiver 42 located at the customer location. Since the transmitter 64 is only required to transmit signals through the distribution line 26 and not through the highly attenuating distribution transformer 20, the power output of the transmitter 64 may be relatively low and still provide sufficient signal strength to the receiver 42. As can be seen in FIG. 1, the relatively high power transmitter 56 and the relatively low power transmitter 64 are connected to approximately the same location on the distribution line 26.

Figure 2:
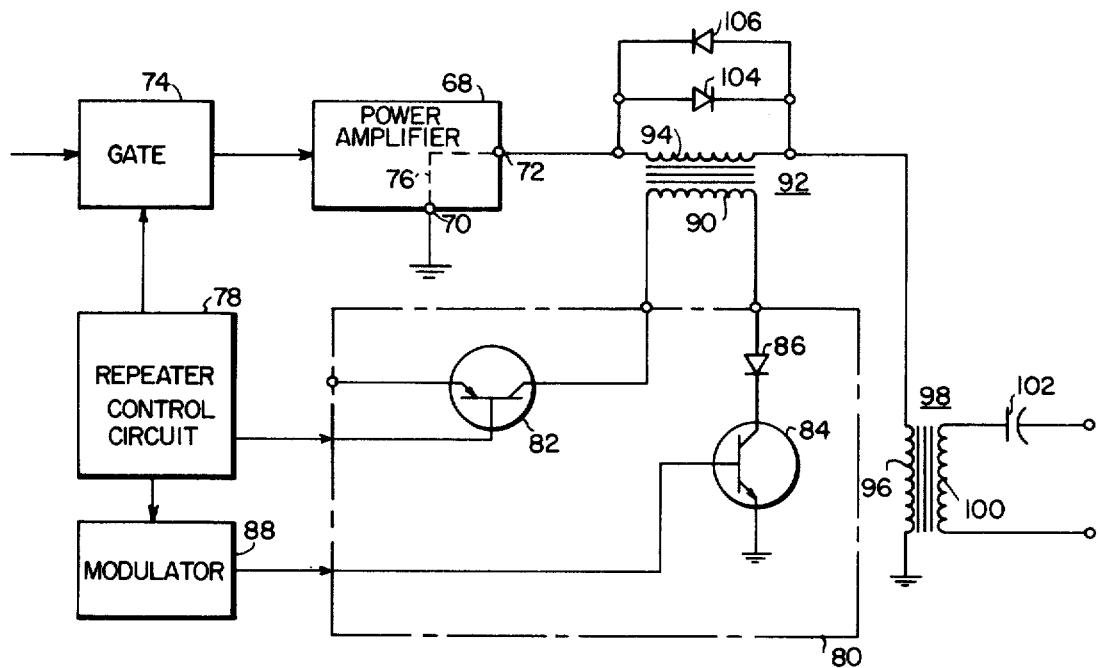
FIG. 2 is a schematic diagram of an interconnecting arrangement, constructed according to this invention, for connecting a high-power communication transmitter and a low-power communication transmitter to the same power distribution line.

FIG. 2 is a schematic diagram of an arrangement which may be used to connect the high-power transmitter 56 and the low-power transmitter 64, shown in FIG. 1, to the distribution line 26. With the circuit illustrated in FIG. 2, the low output impedance of the high-power transmitter is actually used to advantage, rather than presenting a power consuming load to the low-power transmitter. In addition, the arrangement shown in FIG. 2 provides sufficient protection for the output circuits of the low-power transmitter from voltage developed when the high-power transmitter is transmitting.

The power amplifier 68 of the high-power transmitter includes output terminals 70 and 72. The power amplifier 68 is controlled by the gate 74 which turns the drive to the power amplifier 68 on and off at the appropriate times. When the power amplifier 68 is turned on for transmitting, an output signal is developed across the terminals 70 and 72. When the power amplifier 68 is turned off by the gate 74, no signal is developed across the terminals 70 and 72. However, due to the quiescent conditions of the power amplifier 68, the output terminal 72 is effectively or virtually connected to ground potential, as indicated by the line 76. Synchronization or control of the high-power transmitter and the low-power transmitter is maintained by the repeater control circuit 78 which assures that the power amplifier 68 of the high-power transmitter and the output stage 80 of the low-power transmitter do not transmit simultaneously.

The low-power transmitter output stage 80 includes the transistors 82 and 84 and the diode 86 which are connected as illustrated in FIG. 2. The modulator 88 drives the transistor 84 with the desired intelligence information. The output stage 80 is effectively turned off by the control circuit 78 by placing a positive voltage on the base of the transistor 82 and effectively grounding the base of the transistor 84. When the low-power transmitter is turned on, the output voltage of the output stage 80 is applied across the first or primary winding 90 of the interconnecting transformer 92. The diode 86 of the output stage 80 is used to prevent current flow through the collector-base junctions of the transistors 82 and 84 when a voltage is developed across the primary winding 90 by the power amplifier 68.

The output terminal 72 of the power amplifier 68 is connected to the secondary winding 94 of the interconnecting transformer 92. The winding 94 is also connected to the primary winding 96 of the coupling transformer 98. The coupling transformer 98 also includes the secondary winding 100 which is connected, through the coupling capacitor 102, to the secondary distribution line. A voltage limiting device, such as the back-to-back connected diodes 104 and 106, is connected across the secondary winding 94 of the interconnecting transformer 92 to limit the voltage which may be developed across the winding 94, primarily as a result of the output voltage generated by the power amplifier 68.

When the low-power transmitter is turned off and the high-power transmitter is turned on, a relatively high output voltage is generated between the terminals 70 and 72. This voltage is transferred to the primary winding 96 of the coupling transformer 98. The voltage applied to the primary winding 96 is substantially equal to the voltage generated at the output terminals of the power amplifier 68 since the voltage drop across the winding 94 is limited by the diodes 104 and 106. Using conventional diodes, the maximum peak-to-peak voltage drop which may occur across the winding 94 is approximately 1.3 volts. Since the output voltage of the power amplifier 68 may be in the neighborhood of approximately 15 volts peak-to-peak, substantially most of the output voltage is applied across the primary winding 96 and is effectively coupled to the distribution line 26.

For proper impedance matching, the turns ratio of the interconnecting transformer 92 is such that the primary winding 90 has a greater number of turns than the secondary winding 94. Thus, the voltage developed across the primary winding 90 when the high-power transmitter is turned on cannot be greater than 1.3 volts peak-to-peak multiplied by the turns ratio of the transformer 92. Such a magnitude of voltage is low enough to prevent any damage to the components of the output stage 80. When the polarity of the voltage induced in the primary winding 90 is such that conduction through the diode 86 may occur, current conduction is prevented by the junctions of the transistors 82 and 84. When the polarity across the winding 90 is such that conduction may occur through the transistor junctions, the diode 86 is reverse biased in order to prevent current from flowing between the transistors 82 and 84.

When the high-power transmitter is not transmitting, the power amplifier 68 is turned off by the gate 74. However, as previously explained, the output terminal 72 of the power amplifier 68 is effectively connected to ground potential when not transmitting. When the output stage of the low-power transmitter is turned on for generating a signal across the primary winding 90 of the interconnecting transformer 92, an output voltage is developed across the winding 94. Since the magnitude of the voltage developed across the winding 94 is from the low-power transmitter and is of relatively small voltage, the voltage limiting action of the diodes 104 and 106 does not present a low impedance path for the voltage developed across the winding 94. Typically, the voltage developed across the winding 94 would be less than one volt. This voltage is effectively applied to the primary winding 96 of the coupling transformer 98 and ultimately to the distribution line. Thus, the output voltage from the low-power transmitter is coupled to the distribution line by actually flowing through a circuit which extends through the power amplifier 68 of the high-power transmitter.

Figure 3:
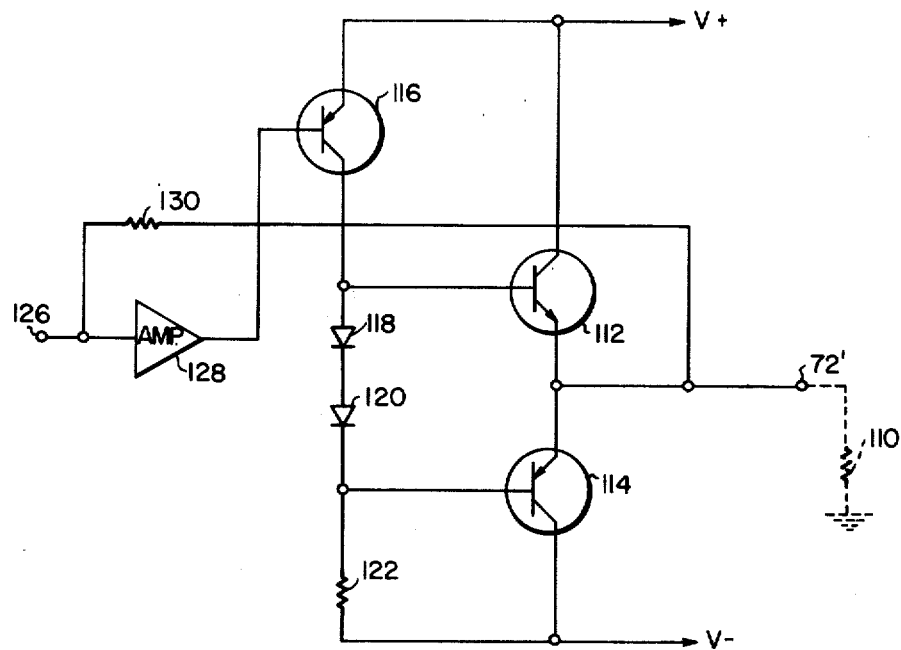
FIG. 3 is a schematic diagram of the output stage of the high-power transmitter shown in FIG. 2.

FIG. 3 is a schematic diagram of a portion of a high-power transmitter which may be used to provide a virtual ground at the output terminal when the transmitter is turned off. The load impedance to the high-power transmitter is represented by the resistor 110 which is connected to the output terminal 72'. The complementary transistors 112 and 114 are connected between sources of positive and negative potential with respect to ground potential. The transistor 116 controls the current through the diodes 118 and 120 and through the resistor 122. A control signal, which is referenced to ground, is applied to the terminal 126 and is amplified by the DC amplifier 128 and applied to the base of the transistor 116.

The voltage across the base-emitter junctions of the transistors 112 and 114 is substantially equal to the voltage drops across the diodes 118 and 120. Thus, the terminal 72' is substantially at the same potential as the potential of the connection between the diodes 118 and 120. With equal current flowing through the transistors 112 and 114, the voltage at terminal 72' is midway between the plus and minus supply voltages, that is, at zero ground potential. The negative feedback provided by the resistor 130 helps to maintain the voltage at the terminal 72' at ground potential when the high-power transmitter is turned off. When the high-power transmitter is turned on, the transistor 116 is driven in such a manner that the collector to emitter resistance of the transistors 112 and 114 become unequal. Thus, a voltage on terminal 72' develops which is either above or below ground potential, depending on which transistor represents the lower impedance.

With the arrangement disclosed herein, coupling of a high-power transmitter and a low-power transmitter to the same location may be accomplished without complicated switching elements, either electromechanical or solid state, and without unnecessary loading of the low-power transmitter due to a low impedance of the high-power transmitter.

Since numerous changes may be made in the above described apparatus, and since different embodiments of the invention may be made without departing from the spirit thereof, it is intended that all of the matter contained in the foregoing description, or shown in the accompanying drawing, shall be interpreted as illustrative rather than limiting.

What is claimed is:

1. Apparatus for connecting separate transmitters of a power line communication system to the same power line, comprising:
    a first transmitter having an output terminal, said output terminal being effectively maintained at ground potential when the first transmitter is not transmitting;
    a second transmitter having first and second output terminals;
    means for coupling signals to the power line;
    an interconnecting transformer having first and second windings, said first winding being connected across the output terminals of the second transmitter, and said second winding being connected between the output terminal of the first transmitter and the means for coupling signals to the power line; and
    means for limiting the voltage across said second winding.

2. The apparatus of claim 1 wherein the output power from the first transmitter is higher than the output power from the second transmitter.

3. The apparatus of claim 1 wherein the output terminal of the first transmitter is electrically connected between two complementary transistors which provide a virtual ground potential when the first transmitter is not transmitting.

4. The apparatus of claim 1 wherein the means for coupling signals to the power line comprises a capacitor and a coupling transformer having first and second windings, said first winding being connected between the second winding of the interconnecting transformer and ground potential, and said second winding being connected through said capacitor to the power line.

5. The apparatus of claim 1 wherein the first winding of the interconnecting transformer has more turns than the second winding of said transformer.

6. The apparatus of claim 1 wherein the means for limiting the voltage drop across the second winding of the interconnecting transformer includes a semiconductor device which limits the voltage drop to approximately the drop across the device junction when biased for forward conduction.

7. The apparatus of claim 1 wherein the second transmitter includes means for preventing damage to the circuit components of the second transmitter when the first transmitter induces a voltage across the first winding of the interconnecting transformer.

8. Apparatus for connecting separate transmitters of a power line communication system to the same secondary distribution line, comprising:
    a first transmitter having an output terminal which is maintained at a virtual ground potential when the first transmitter is not transmitting;
    a second transmitter having a lower output power than said first transmitter;
    an interconnecting transformer having first and second windings with the number of turns on the first winding being greater than the number of turns on the second winding, said first winding being connected to output terminals of the second transmitter;
    a coupling transformer having primary and secondary windings, with said secondary winding being coupled to the secondary distribution line and with said primary winding connected between ground potential and one end of the second winding of the interconnecting transformer, the other end of said second winding being connected to the output terminal of the first transmitter; and means for limiting the voltage which may develop across the second winding of the interconnecting transformer.

* * * * *